US011863028B2

(12) United States Patent
Lee (10) Patent No.: US 11,863,028 B2
(45) Date of Patent: Jan. 2, 2024

(54) BUSBAR UNIT FOR MOTOR (71) Applicant: HYUNDAI MOBIS CO., LTD., Seoul (KR)

(72) Inventor: Bit Na Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 70 days.

(21) Appl. No.: 17/382,843

(22) Filed: Jul. 22, 2021

(65) Prior Publication Data

US 2022/0029498 A1 Jan. 27, 2022

(30) Foreign Application Priority Data

Jul. 23, 2020 (KR) ........................ 10-2020-0091932

(51) Int. Cl.
*H02K 11/25* (2016.01)
*H02K 3/52* (2006.01)
*H02K 5/22* (2006.01)

(52) U.S. Cl.
CPC ............. *H02K 11/25* (2016.01); *H02K 3/522* (2013.01); *H02K 5/225* (2013.01); *H02K 2203/09* (2013.01)

(58) Field of Classification Search
CPC .......... H02K 11/25; H02K 5/225; H02K 3/50; H02K 3/522; H02K 3/52; H02K 7/006; H02K 3/12; H02K 21/14; H02K 2203/09; H02K 11/00; H02K 11/27; H02K 5/22
USPC ....................................... 310/68 B, 68 C, 71
See application file for complete search history.

(56) References Cited

U.S. PATENT DOCUMENTS

| | | | | |
|---|---|---|---|---|
| 2013/0270971 | A1* | 10/2013 | Dorner | H02K 3/522 |
| | | | | 310/68 B |
| 2021/0344247 | A1* | 11/2021 | Tsuchiya | H02K 3/50 |
| 2022/0320970 | A1* | 10/2022 | Takada | G01K 1/14 |

FOREIGN PATENT DOCUMENTS

| | | | |
|---|---|---|---|
| FR | 3046505 A1 * | 7/2017 | |
| JP | 2018186643 A * | 11/2018 | |
| WO | WO-2021043352 A1 * | 3/2021 | ........... H01R 25/162 |

OTHER PUBLICATIONS

Ito Yuji, Resin Molding, Nov. 22, 2018, JP 2018186643 (English Machine Translation) (Year: 2018).*
Silvery et al, Sensor Fastener for Measuring a Temperature in an Electric Machine of a Motor Vehicle, Mar. 11, 2021, WO 2021043352 (English Machine Translation) (Year: 2021).*
Ryadh et al, Stator for a Rotating Electric Machine, Jul. 7, 2017, FR 3046505 (English Machine Translation) (Year: 2017).*

* cited by examiner

*Primary Examiner* — Alexander A Singh
(74) *Attorney, Agent, or Firm* — MORGAN, LEWIS & BOCKIUS LLP (57) ABSTRACT

The present disclosure relates to a busbar unit for a motor, which includes: a terminal; a holder configured to support the terminal and having an accommodation portion disposed in an outer surface of the holder; and a temperature measurement module disposed in the accommodation portion, thereby simplifying a structure of the busbar unit and a process of assembling the busbar unit and improving stability and reliability of the busbar unit.

11 Claims, 11 Drawing Sheets

BUSBAR UNIT FOR MOTOR

CROSS-REFERENCE TO RELATED APPLICATION

This application claims priority to and the benefit of Korean Patent Application No. 10-2020-0091932 filed in the Korean Intellectual Property Office on Jul. 23, 2020, the entire contents of which are incorporated herein by reference.

TECHNICAL FIELD

The present disclosure relates to a busbar unit for a motor, and more particularly, to a busbar unit for a motor, which may have a simple structure, simplify a process of assembling the busbar unit, and improve stability and reliability of the busbar unit.

BACKGROUND ART

A hybrid vehicle or an electric vehicle, which is called an environmentally-friendly vehicle, generates driving power using an electric motor (hereinafter, referred to as a 'drive motor') that obtains rotational force from electrical energy.

In general, the drive motor includes a stator coupled to a housing, and a rotor rotatably disposed in the stator with a predetermined air gap from the stator.

The stator includes stator cores provided by stacking electrical steel sheets, and stator coils wound around the stator cores.

A busbar is provided at an upper side of the stator, and the stator coils are connected to an external power source through the busbar.

The busbar may be structured to include a plurality of terminals inside a ring-shaped holder, and the terminals may be constituted as a combination of phase terminals connected to U-phase, V-phase, and W-phase power sources, and a neutral terminal that connects the phase terminals.

Meanwhile, high-temperature heat is produced when the motor operates. If the temperature of the motor is raised to a predetermined temperature or higher, the efficiency and lifespan of the motor may deteriorate. Therefore, it is necessary to monitor the temperature of the motor and stop the operation of the motor when the temperature of the motor is raised to a predetermined temperature or higher.

In the related art, however, a temperature measurement module for monitoring the temperature of the motor is mounted directly on the stator coil, which makes the process of mounting the temperature measurement module complicated and inconvenient. Further, a structure (hairpin structure) for winding the stator coil restricts the position at which the temperature measurement module is mounted.

Moreover, it is necessary to dispose the temperature measurement module at a proper posture and position corresponding to the structure of the stator coil. However, in the related art, there is a high likelihood that the temperature measurement module is incorrectly assembled due to an operator's carelessness or the like.

In addition, in the related art, because the structures for winding the stator coils vary depending on the types of motors, it is difficult to use the temperature measurement modules in common, and the temperature measurement modules need to be individually manufactured in accordance with the types of motors, which increases development and manufacturing costs.

Therefore, recently, various studies are conducted to simplify the structure for mounting the temperature measurement module and improve the stability and reliability of the temperature measurement module, but the study results are still insufficient. Accordingly, there is a need to develop a technology to simplify the structure for mounting the temperature measurement module and improve the stability and reliability of the temperature measurement module.

SUMMARY

The present disclosure has been made in an effort to provide a busbar unit for a motor, which may have a simple structure, simplify a process of assembling the busbar unit, and improve stability and reliability of the busbar unit.

The present disclosure has also been made in an effort to easily mount a temperature measurement module regardless of a structure for winding a stator coil.

The present disclosure has also been made in an effort to make it possible to use a temperature measurement module in common and prevent incorrect assembly of the temperature measurement module.

The present disclosure has also been made in an effort to improve performance and accuracy of a temperature measurement module.

The objects to be achieved by the embodiments are not limited to the above-mentioned objects, but also include objects or effects that may be understood from the solutions or embodiments described below.

In one aspect, the present disclosure provides a busbar unit for a motor, which includes: a terminal; a holder configured to support the terminal and having an accommodation portion disposed in an outer surface of the holder; and a temperature measurement module provided in the accommodation portion.

This is to simplify a structure of the busbar unit and a process of assembling the busbar unit and improve stability and reliability of the busbar unit.

That is, in the related art, a temperature measurement module for monitoring the temperature of the motor is mounted directly on the stator coil, which makes the process of mounting the temperature measurement module complicated and inconvenient. Further, a structure (hairpin structure) for winding the stator coil restricts the position at which the temperature measurement module is mounted.

Moreover, it is necessary to dispose the temperature measurement module at a proper posture and position corresponding to the structure of the stator coil. However, in the related art, there is a high likelihood that the temperature measurement module is incorrectly assembled due to an operator's carelessness or the like. Further, because the structures for winding the stator coils vary depending on the types of motors, it is difficult to use the temperature measurement modules in common, and the temperature measurement modules need to be individually manufactured in accordance with the types of motors, which increases development and manufacturing costs.

In contrast, according to the embodiment of the present disclosure, the temperature measurement module is integrated with the busbar unit. Therefore, it is possible to obtain an advantageous effect of simplifying the structure for mounting the temperature measurement module and improving the stability and reliability of the busbar unit.

Among other things, according to the embodiment of the present disclosure, the accommodation portion is provided in the holder of the busbar unit, and the temperature measurement module is mounted in the accommodation portion.

Therefore, the temperature measurement module may be easily mounted regardless of the structure for winding the stator coil.

For reference, in the embodiment of the present disclosure, the outer surface of the holder may be defined as including both the upper surface and the outer circumferential surface of the holder.

For example, the accommodation portion may be provided in the upper surface of the holder and disposed in an axial direction of the motor.

In particular, the accommodation portion may be recessed from the outer surface of the holder, and at least a part of the temperature measurement module may be accommodated in the accommodation portion.

Further, a portion of the temperature measurement module may be disposed at a level higher than an upper surface of the holder in an axial direction of the motor.

The temperature measurement module may have various structures capable of being accommodated in the accommodation portion and monitoring the temperature of the motor.

For example, the temperature measurement module may include a temperature sensor, and a sensor housing surrounding the temperature sensor.

In particular, the temperature sensor may be in close contact with a bottom surface of the accommodation portion. Since the temperature sensor is in close contact with the bottom surface of the accommodation portion as described above, the contact area between the temperature sensor and the holder may increase. Therefore, it is possible to obtain an advantageous effect of improving the temperature measurement accuracy of the temperature sensor.

More particularly, the bottom surface may be a flat surface, and the temperature sensor may be in surface contact with the bottom surface.

According to the exemplary embodiment of the present disclosure, an adhesive layer may be provided on the bottom surface of the accommodation portion, and the temperature measurement module may be attached to the adhesive layer.

Since the adhesive layer is disposed on the bottom surface of the accommodation portion and the temperature measurement module is attached to the adhesive layer as described above, it is possible to obtain an advantageous effect of stably maintaining the arrangement state of the temperature measurement module.

In particular, the adhesive layer may include a thermally conductive bonding agent.

According to the exemplary embodiment of the present disclosure, a filling layer may include a filling material and may be disposed in a space defined between an inner surface of the accommodation portion and the temperature measurement module.

According to the exemplary embodiment of the present disclosure, a fixing hole may be formed in the bottom surface of the accommodation portion, and a fixing protrusion may protrude from a bottom surface of the sensor housing and configured to be accommodated in the fixing hole.

As described above, the fixing protrusions are accommodated (inserted) into the fixing holes, respectively, when the temperature measurement module is seated in the accommodation portion. Therefore, it is possible to obtain an advantageous effect of stably maintaining the state in which the temperature measurement module is seated.

In addition, when the posture and the position of the temperature measurement module are misaligned, the fixing protrusion cannot be inserted into the fixing hole, and the temperature measurement module protrudes in an abnormal posture. Therefore, the operator may easily recognize whether the temperature measurement module is incorrectly assembled.

According to the exemplary embodiment of the present disclosure, a guide protrusion may protrude from a lateral wall surface of the accommodation portion, and a guide groove may be formed in the sensor housing and configured to accommodate the guide protrusion.

Since the guide protrusions are provided on the accommodation portion and the guide grooves are provided in the sensor housing as described above, the temperature measurement module may be accommodated in the accommodation portion only in the state in which the guide protrusions and the guide grooves are aligned (in the vertical direction). Therefore, it is possible to obtain an advantageous effect of improving the accuracy in assembling the temperature measurement module and minimizing the incorrect assembly.

According to the exemplary embodiment of the present disclosure, a coupling hole may be formed in the sensor housing, and a snap-fit coupling portion may be disposed on the accommodation portion and configured to be coupled to the coupling hole in a snap-fit manner.

As described above, the snap-fit coupling portions are coupled to the coupling holes, respectively, when the temperature measurement module is seated in the accommodation portion. Therefore, it is possible to obtain an advantageous effect of stably maintaining the state in which the temperature measurement module is seated.

DETAILED DESCRIPTION

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 11, a busbar unit 100 for a motor according to an embodiment of the present disclosure includes terminals 200, a holder 300 configured to support the terminals 200 and having an accommodation portion 310 provided in an outer surface of the holder 300, and a temperature measurement module 400 provided in the accommodation portion 310.

For reference, the busbar unit 100 for a motor according to the embodiment of the present disclosure may be mounted in various types of motors in accordance with required conditions and design specifications, and the present disclosure is not restricted or limited by the types and structures of the motors.

As an example, a motor, to which the busbar unit 100 according to the embodiment of the present disclosure is applied, may be used as a drive motor for an environmentally-friendly vehicle, such as a hybrid vehicle and/or an electric vehicle, which obtains driving power from electrical energy.

Figure 1:
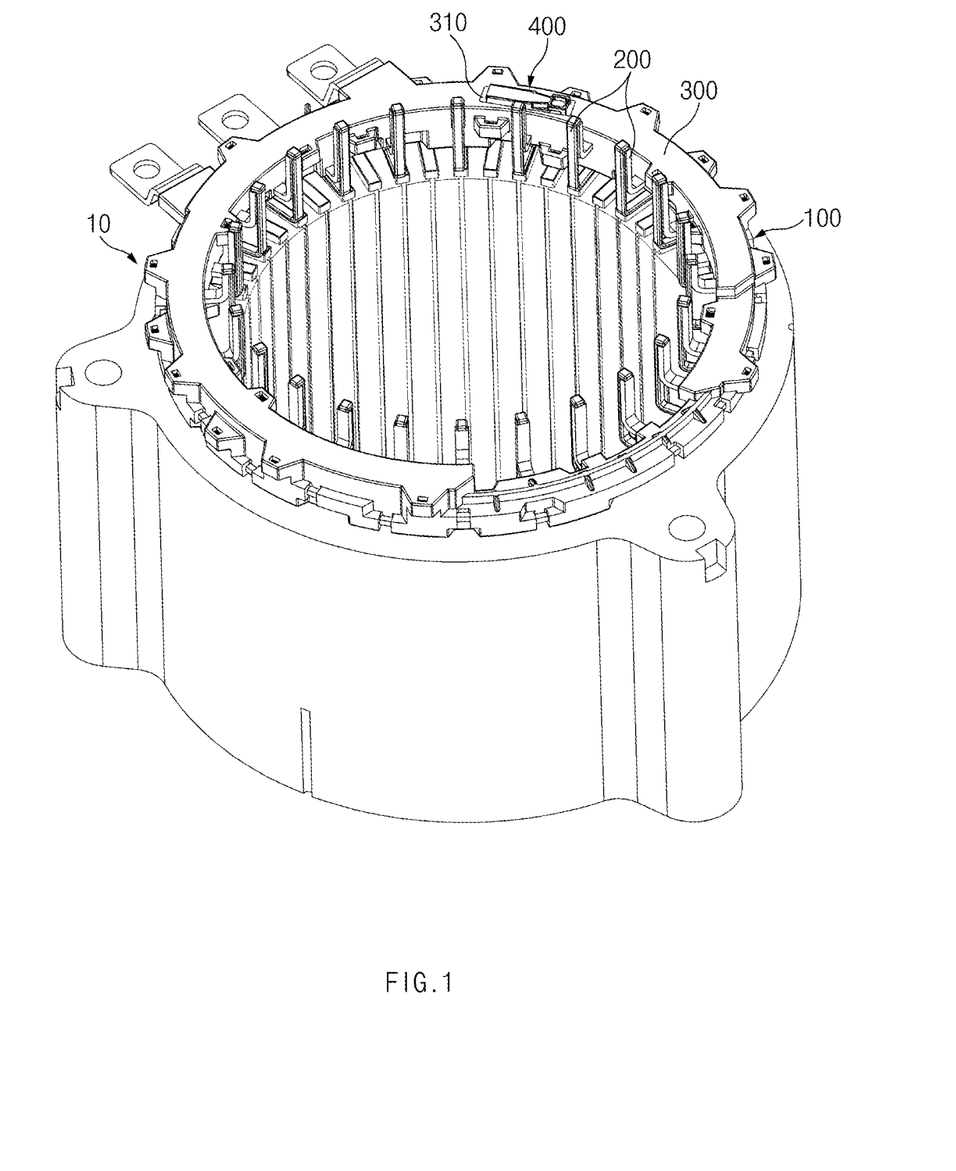
FIG. 1 is a view for explaining an example in which a busbar unit for a motor according to an embodiment of the present disclosure is mounted.

For example, the drive motor is an inner-rotor-type synchronous motor and includes the stator 10 installed in a motor housing (not illustrated), and a rotor (not illustrated) rotatably installed in the stator 10 with a predetermined air gap from the stator 10. The busbar unit 100 according to the embodiment of the present disclosure may be connected to the stator 20.

The stator 10 may be accommodated in the housing (not illustrated), and coils (not illustrated) may be wound around the stator 10 so as to induce an electrical interaction between the stator and the rotor.

For example, the stator 10 includes a plurality of split cores (not illustrated) provided to cooperatively define a ring shape, and a support ring (not illustrated) provided to surround outer circumferential surfaces of the plurality of split cores.

The split core may be variously changed in number and structure in accordance with required conditions and design specifications, and the present disclosure is not restricted or limited by the number of split cores and the structure of the split core.

More specifically, the split core may be provided by stacking a plurality of electrical steel sheets in an axial direction of the rotor.

A bobbin (not illustrated) (made of plastic, for example) is provided around each of the split cores, and the coil is wound around the bobbin.

According to another embodiment of the present disclosure, the stator may include a single core.

The rotor is provided to be rotated by the electrical interaction between the stator 10 and the rotor.

As an example, the rotor may include a rotor core (not illustrated) and magnets (not illustrated). The rotor core may be structured by stacking a plurality of circular plates each provided in the form of a thin steel sheet or structured in the form of a bin.

A hole (not illustrated), to which a shaft is coupled, may be provided at a center of the rotor. Protrusions (not illustrated), which guide the magnets, may protrude from an outer circumferential surface of the rotor core. The magnets may be attached to the outer circumferential surface of the rotor core so as to be spaced apart from one another at predetermined intervals in a circumferential direction of the rotor core.

In addition, the rotor may include a can member (not illustrated) disposed to surround the magnets and configured to prevent the separation of the magnets.

Figure 2:
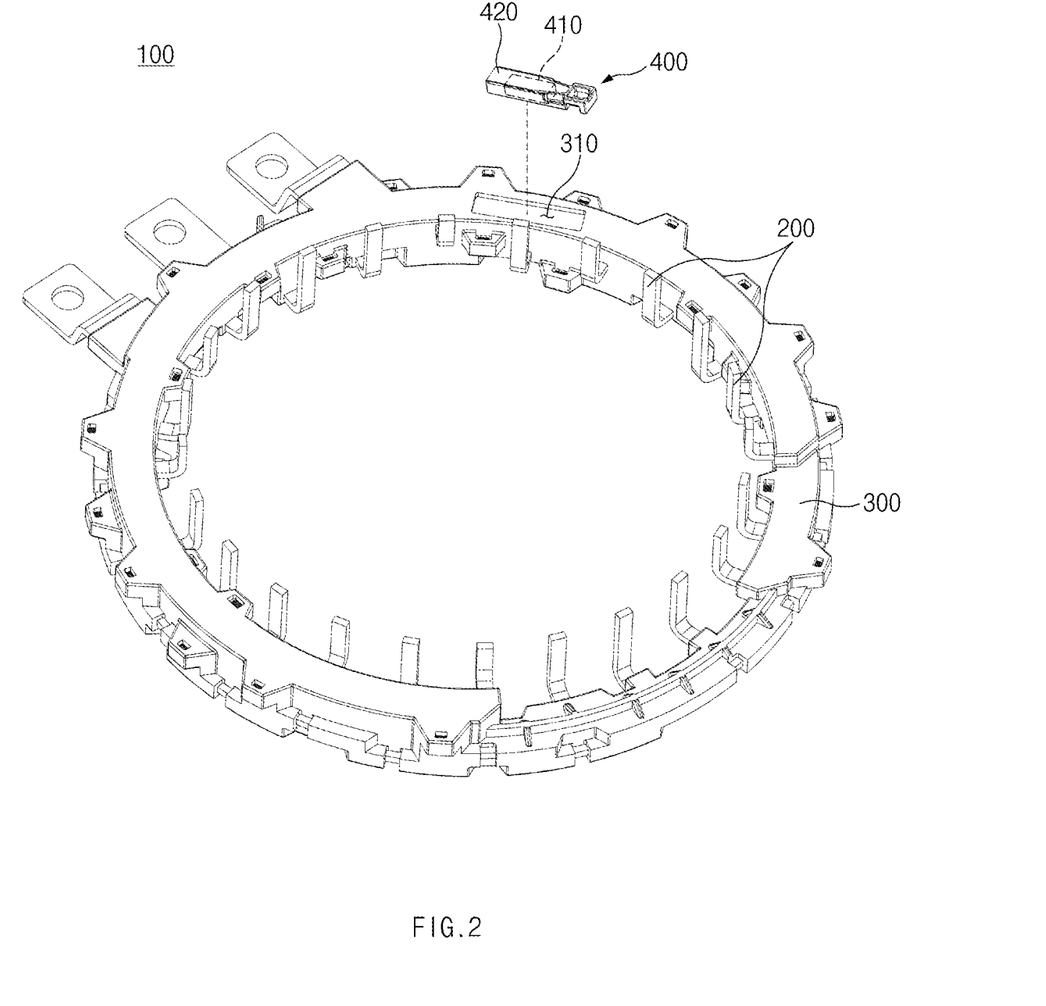
FIG. 2 is a view for explaining the busbar unit for a motor according to the embodiment of the present disclosure.

The busbar unit 100 includes the terminals 200, the holder 300, and the temperature measurement module 400. The busbar unit 100 is disposed at an upper side of the stator 10.

The terminal 200 is provided to electrically connect the coil of the stator 10 to an external power source.

The terminal 200 may be at least any one of phase terminals (a U-phase terminal, a V-phase terminal, and a W-phase terminal) connected to a U-phase power source, a V-phase power source, and a W-phase power source and a neutral terminal for electrically connecting the phase terminals. For example, the busbar unit 100 may include a total of four terminals 200 (the U-phase terminal, the V-phase terminal, the W-phase terminal, and the neutral terminal).

More specifically, the terminal 200 includes a body (not illustrated) accommodated in the holder 300, and a terminal portion (not illustrated) protruding from an inner circumferential surface of the body and connected to the coil.

The body may be variously changed in structure and shape in accordance with required conditions and design specifications. For example, the body may have a single-layered structure and may be provided as a band member in the form of an arc (or a ring) having a predetermined curvature.

According to another embodiment of the present disclosure, the body may have a double-layered structure (multi-layer structure) having a bent portion.

The terminal portion is provided on the inner circumferential surface of the body. An end of the coil of the stator 10 is connected to (e.g., fused with) the terminal portion.

The terminal portion may have various structures to which the end of the coil may be connected, and the present disclosure is not restricted or limited by the structure and shape of the terminal portion.

In addition, the terminal 200 may include a power terminal portion (not illustrated) protruding from an outer circumferential surface of the holder 300.

The power terminal portion extends from an outer surface of the body and protrudes from the outer circumferential surface of the holder 300. The power terminal portion may be electrically connected to each of external power cables corresponding to the respective phases (the U-phase, the V-phase, and the W-phase).

The holder 300 is provided to support the arrangement state of the terminals 200 and electrically insulate the terminals 200.

The holder 300 may be variously changed in material and shape in accordance with required conditions and design specifications, and the present disclosure is not restricted or limited by the material and shape of the holder 300.

For example, the holder 300 may have a hollow ring shape and be provided as a molded product (made of an insulating material, for example) provided by injection molding.

The accommodation portion 310 is provided in the outer surface of the holder 300, and the temperature measurement module 400 is mounted in the accommodation portion 310.

In this case, the outer surface of the holder 300 is defined as including both the upper surface and the outer circumferential surface of the holder 300.

Hereinafter, an example will be described in which the accommodation portion 310 is provided in the upper surface of the holder 300 and disposed in the axial direction of the motor.

The accommodation portion 310 may have various structures in which the temperature measurement module 400 may be accommodated (or seated), and the present disclosure is not restricted or limited by the structure of the accommodation portion 310.

For example, the accommodation portion 310 may be recessed in the upper surface of the holder 300. At least a part of the temperature measurement module 400 may be accommodated in the accommodation portion 310.

In particular, the accommodation portion 310 may have a shape corresponding to a shape of the temperature measurement module 400.

In the embodiment of the present disclosure illustrated and described above, the example has been described in which the accommodation portion 310 is recessed in the outer surface of the holder 300. However, according to another embodiment of the present disclosure, the accommodation portion may have a structure protruding from the outer surface of the holder.

The temperature measurement module 400 is provided in the accommodation portion 310 and serves to monitor a temperature of the motor (e.g., a temperature of the coil).

The temperature measurement module 400 may have various structures capable of being accommodated in the accommodation portion 310 and monitoring the temperature of the motor.

Figure 3:
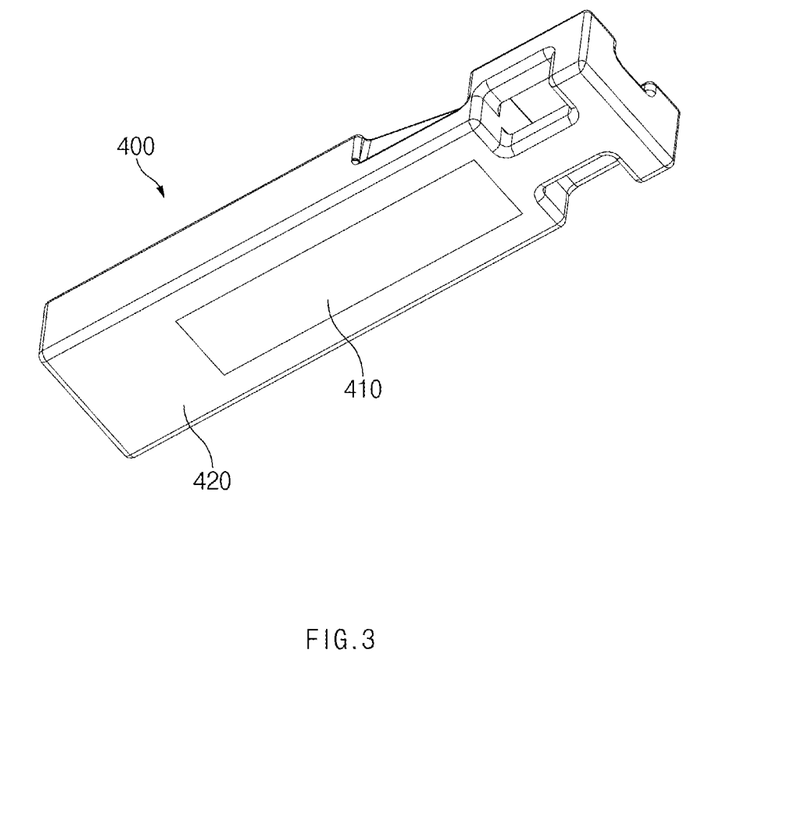
FIGS. 3 and 4 are views for explaining a temperature measurement module of the busbar unit for a motor according to the embodiment of the present disclosure.
Figure 4:
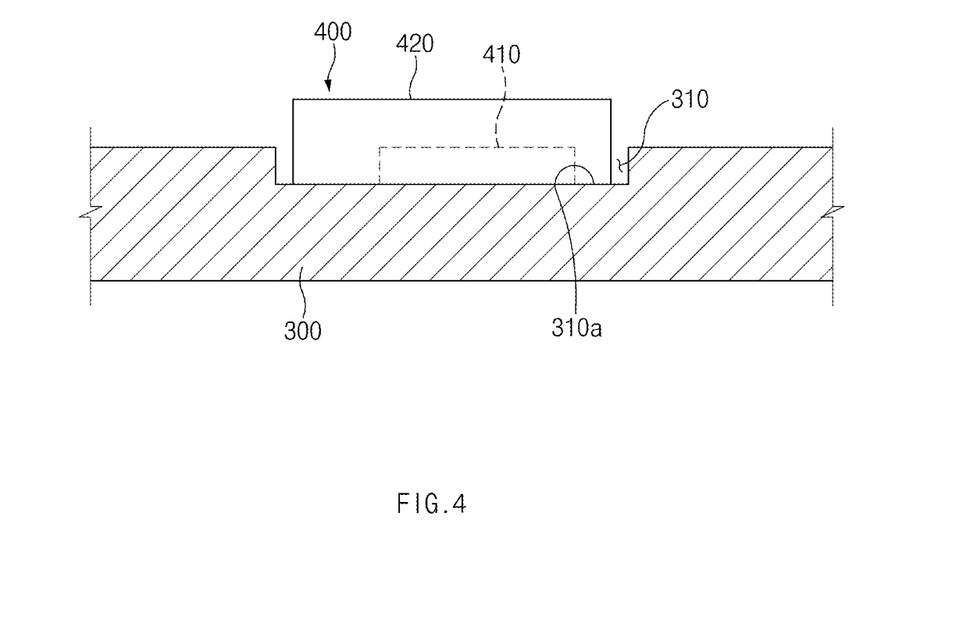

For example, the temperature measurement module 400 may include a temperature sensor 410, and a sensor housing 420 provided to surround the temperature sensor 410.

A typical contact temperature sensor 410 (e.g., a thermocouple or a thermistor) may be used as the temperature sensor 410, and the present disclosure is not restricted or limited by the type of temperature sensor 410 and the sensing methods.

The sensor housing 420 is provided to surround the temperature sensor 410 to protect the temperature sensor 410. The sensor housing 420 is accommodated in the accommodation portion 310.

In particular, the temperature sensor 410 is exposed from a bottom surface of the sensor housing 420 that faces a bottom surface 310*a* of the accommodation portion 310. The exposed surface of the temperature sensor 410 is in close contact with the bottom surface 310*a* of the accommodation portion 310 in the state in which the sensor housing 420 is accommodated in the accommodation portion 310.

Since the temperature sensor 410 is in close contact with the bottom surface 310*a* of the accommodation portion 310 as described above, the contact area between the temperature sensor 410 and the holder 300 may increase. Therefore, it is possible to obtain an advantageous effect of improving the temperature measurement accuracy of the temperature sensor 410.

More particularly, the bottom surface 310*a* of the accommodation portion 310 is a flat surface, and the temperature sensor 410 is in surface contact with the bottom surface 310*a*.

According to another embodiment of the present disclosure, the bottom surface of the accommodation portion may be a curved surface.

Figure 5:
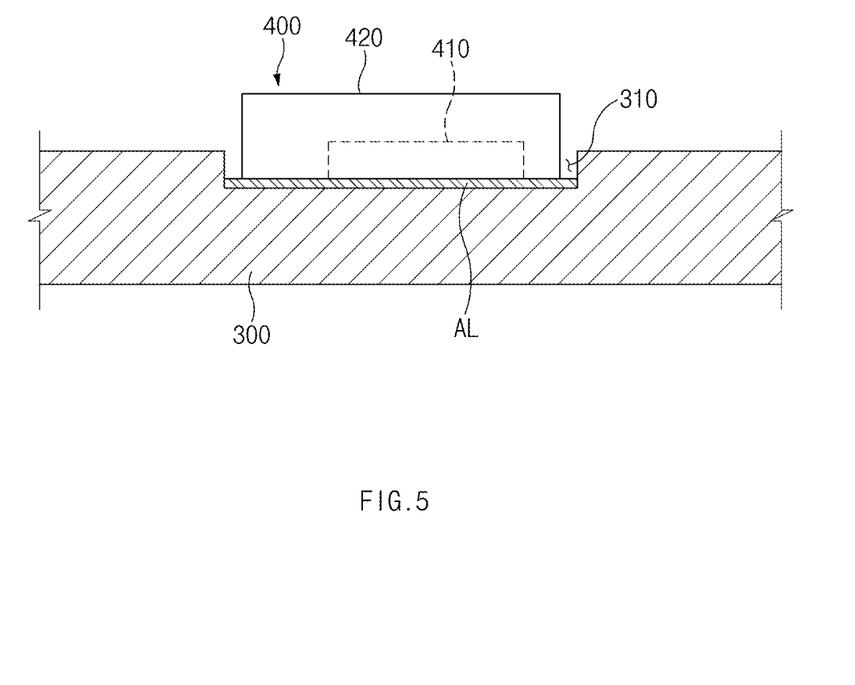
FIG. 5 is a view for explaining an adhesive layer in the busbar unit for a motor according to the embodiment of the present disclosure.

Referring to FIG. 5, according to the exemplary embodiment of the present disclosure, an adhesive layer AL may be provided on the bottom surface 310*a* of the accommodation portion 310, and the temperature measurement module 400 may be attached to the adhesive layer AL.

Since the adhesive layer AL is provided on the bottom surface 310*a* of the accommodation portion 310 and the temperature measurement module 400 is attached to the adhesive layer AL as described above, it is possible to obtain an advantageous effect of stably maintaining the arrangement state of the temperature measurement module 400.

In particular, the adhesive layer AL is made of a thermally conductive bonding agent (e.g., epoxy bonding agent). Since the adhesive layer AL is made of a thermally conductive bonding agent as described above, it is possible to obtain an advantageous effect of minimizing deterioration in temperature detection performance of the temperature sensor 410 caused by the adhesive layer AL.

Figure 6:
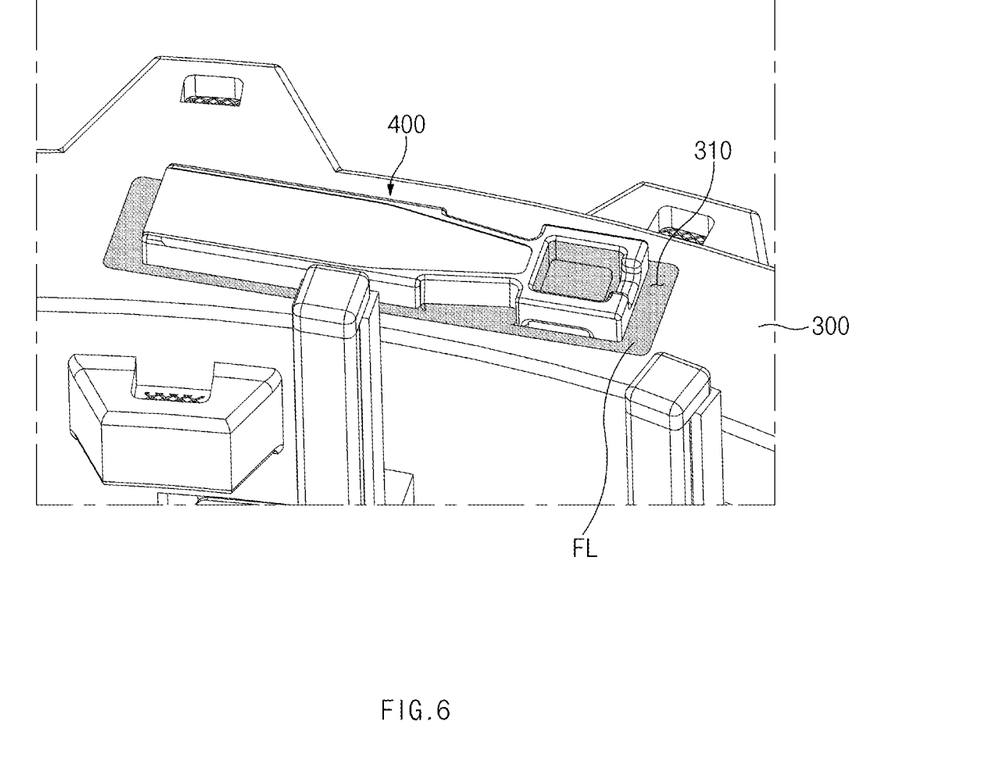
FIGS. 6 and 7 are views for explaining a filling layer in the busbar unit for a motor according to the embodiment of the present disclosure.
Figure 7:
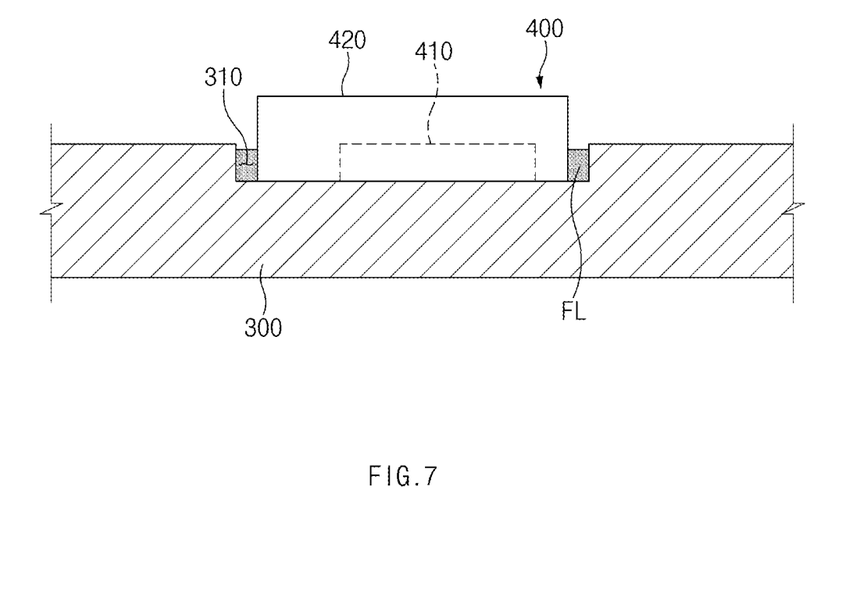

According to another embodiment of the present disclosure, as illustrated in FIGS. 6 and 7, a filling layer FL may be provided, instead of the adhesive layer AL, by filling a space between an inner surface of the accommodation portion 310 and the temperature measurement module 400 with a filling material (e.g., epoxy).

The temperature measurement module 400 accommodated in the accommodation portion 310 may be integrally fixed to the filling layer FL by curing the filling layer FL.

Figure 8:
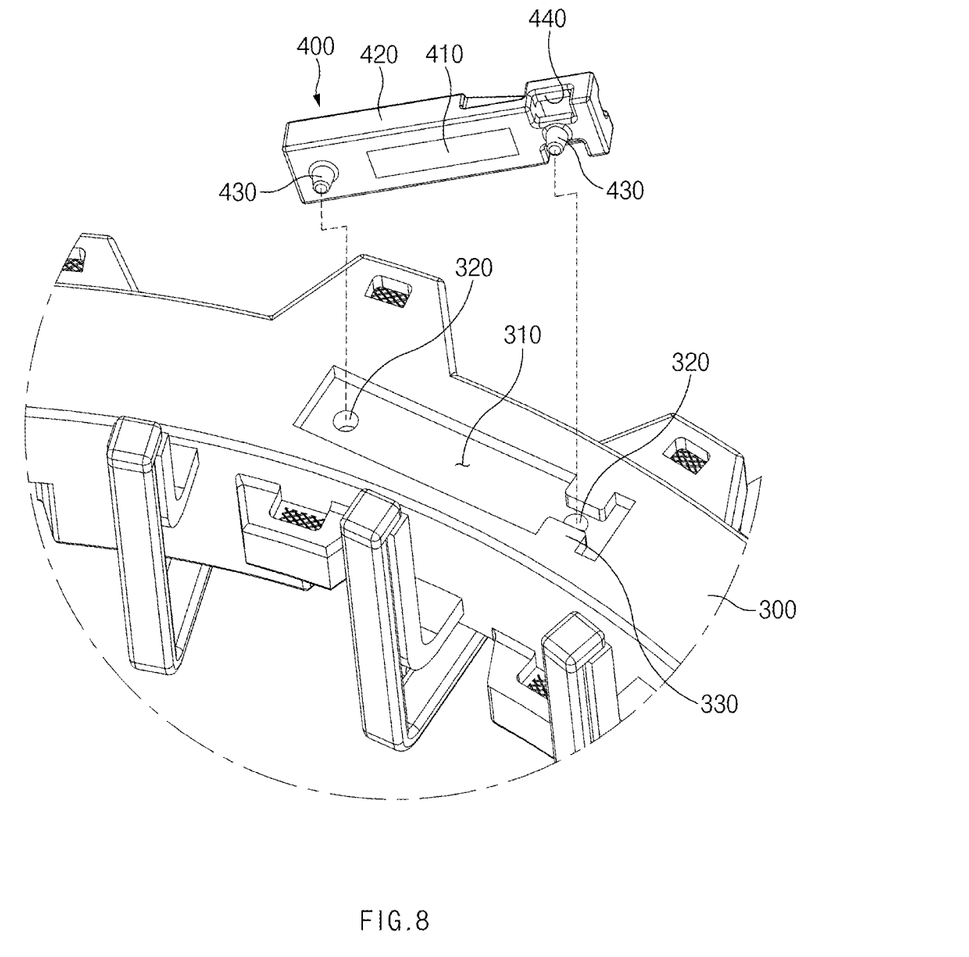
FIGS. 8 and 9 are views for explaining a structure in which the temperature measurement module and a holder of the busbar unit for a motor according to the embodiment of the present disclosure are coupled.
Figure 9:
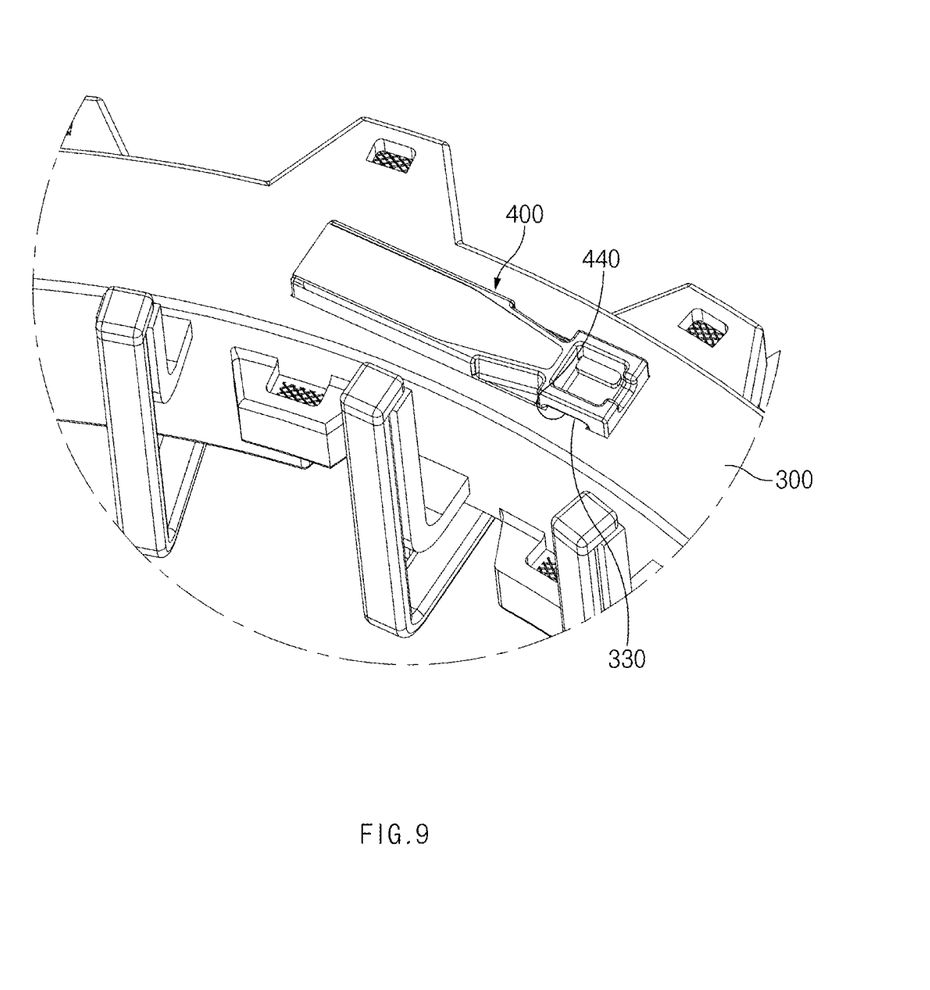

Referring to FIGS. 8 and 9, according to the exemplary embodiment of the present disclosure, fixing holes 320 may be provided in the bottom surface 310*a* of the accommodation portion 310, and fixing protrusions 430 may be provided on the bottom surface of the sensor housing 420 that faces the bottom surface 310*a* of the accommodation portion 310. The fixing protrusion 430 may be accommodated in the fixing hole 320.

For example, two fixing holes 320 may be provided in the bottom surface 310*a* of the accommodation portion 310 so as to be spaced apart from each other, and two fixing protrusions 430 each having a circular cross-section may be provided on the bottom surface of the sensor housing 420.

In particular, the fixing protrusion 430 may be coupled to the fixing hole 320 in an interference-fit manner.

As described above, the fixing protrusions 430 are accommodated (inserted) into the fixing holes 320, respectively, when the temperature measurement module 400 is seated in the accommodation portion 310. Therefore, it is possible to obtain an advantageous effect of stably maintaining the state in which the temperature measurement module 400 is seated.

In addition, when the posture and the position of the temperature measurement module 400 are misaligned, the fixing protrusion 430 cannot be inserted into the fixing hole 320, and the temperature measurement module 400 protrudes in an abnormal posture. Therefore, the operator may easily recognize whether the temperature measurement module 400 is incorrectly assembled.

In addition, according to the exemplary embodiment of the present disclosure, guide protrusions 330 may be provided on a lateral wall surface of the accommodation portion 310, and guide grooves 440 may be provided in a lateral surface of the sensor housing 420. The guide protrusion 330 may be accommodated in the guide groove 440.

For example, two guide protrusions 330 may be provided on the lateral wall surface of the accommodation portion 310 so as to face each other, and two guide grooves 440 may be provided on the lateral surface of the sensor housing 420.

Since the guide protrusions 330 are provided on the accommodation portion 310 and the guide grooves 440 are provided in the sensor housing 420 as described above, the temperature measurement module 400 may be accommodated in the accommodation portion 310 only in the state in which the guide protrusions 330 and the guide grooves 440 are aligned (in the vertical direction). Therefore, it is possible to obtain an advantageous effect of improving the accuracy in assembling the temperature measurement module 400 and minimizing the incorrect assembly.

Meanwhile, according to another embodiment of the present disclosure, the temperature measurement module 400 may be coupled to the accommodation portion 310 in a snap-fit manner.

Figure 10:
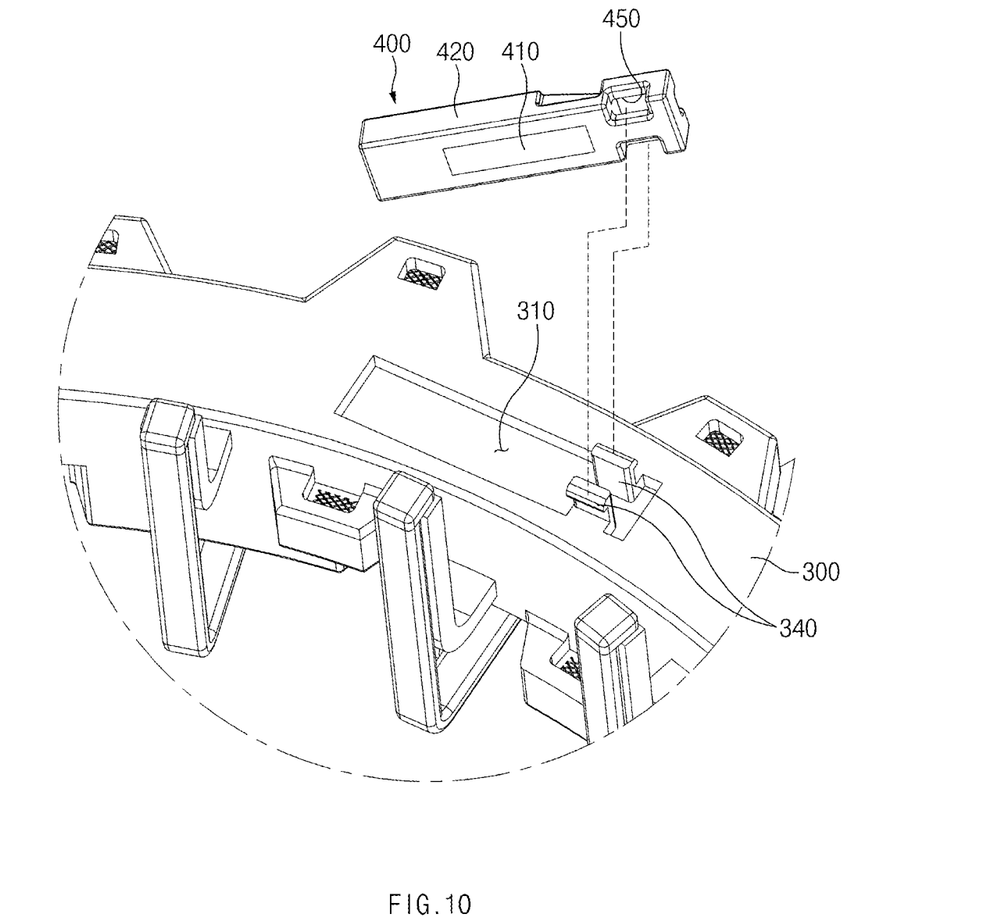
FIGS. 10 and 11 are views for explaining another example of the structure in which the temperature measurement module and the holder of the busbar unit for a motor according to the embodiment of the present disclosure are coupled.
Figure 11:
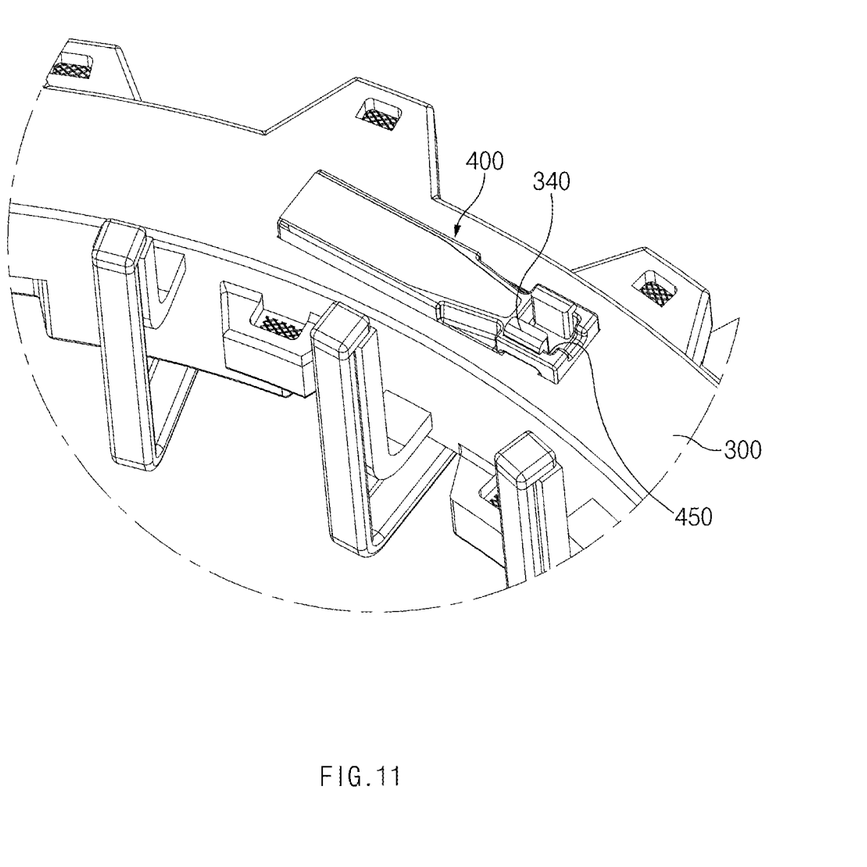

Referring to FIGS. 10 and 11, coupling holes 450 may penetrate the sensor housing 420, and snap-fit coupling portions 340 may be provided on the bottom surface 310a of the accommodation portion 310. The snap-fit coupling portion 340 may be coupled to the coupling hole 450 in a snap-fit manner.

The snap-fit coupling portion 340 may be elastically coupled to the coupling hole 450 in a snap-fit manner by using elasticity of a material (e.g., a plastic material) thereof. The present disclosure is not restricted or limited by the shape and structure of the snap-fit coupling portion 340.

As described above, the snap-fit coupling portions 340 are coupled to the coupling holes 450, respectively, when the temperature measurement module 400 is seated in the accommodation portion 310. Therefore, it is possible to obtain an advantageous effect of stably maintaining the state in which the temperature measurement module 400 is seated.

In addition, when the posture and the position of the temperature measurement module 400 are misaligned, the snap-fit coupling portion 340 cannot be inserted into the coupling hole 450, and the temperature measurement module 400 protrudes in an abnormal posture. Therefore, the operator may easily recognize whether the temperature measurement module 400 is incorrectly assembled.

According to the embodiment of the present disclosure described above, it is possible to obtain an advantageous effect of simplifying the structure of the busbar unit and the process of assembling the busbar unit and improving the stability and reliability of the busbar unit.

In particular, according to the embodiment of the present disclosure, it is possible to obtain an advantageous effect of easily mounting the temperature measurement module regardless of the structure for winding the stator coil.

In addition, according to the embodiment of the present disclosure, it is possible to obtain an advantageous effect of making it possible to use the temperature measurement module in common and minimizing the incorrect assembly of the temperature measurement module.

In addition, according to the embodiment of the present disclosure, it is possible to obtain an advantageous effect of improving the performance and accuracy of the temperature measurement module.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A busbar unit for a motor, comprising:
   a terminal;
   a holder configured to support the terminal and having an accommodation portion disposed in an outer surface of the holder; and
   a temperature measurement module disposed in the accommodation portion,
   wherein the temperature measurement module comprises:
      a temperature sensor;
      a sensor housing surrounding the temperature sensor
      a coupling hole formed in the sensor housing; and
      a snap-fit coupling portion disposed on the accommodation portion and configured to be coupled to the coupling hole in a snap-fit manner.

2. The busbar unit of claim 1, wherein the temperature sensor is in contact with a bottom surface of the accommodation portion.

3. The busbar unit of claim 2, wherein the bottom surface is a flat surface, and the temperature sensor is in surface contact with the bottom surface.

4. The busbar unit of claim 1, comprising:
   a fixing hole formed in a bottom surface of the accommodation portion; and
   a fixing protrusion protruding from a bottom surface of the sensor housing and configured to be accommodated in the fixing hole.

5. The busbar unit of claim 1, comprising:
   a guide protrusion protruding from a lateral wall surface of the accommodation portion; and
   a guide groove formed in the sensor housing and configured to accommodate the guide protrusion.

6. The busbar unit of claim 1, comprising:
   an adhesive layer disposed on a bottom surface of the accommodation portion, wherein the temperature measurement module is attached to the adhesive layer.

7. The busbar unit of claim 6, wherein the adhesive layer includes a thermally conductive bonding agent.

8. The busbar unit of claim 1, comprising:
a filling layer, including a filling material, disposed in a space defined between an inner surface of the accommodation portion and the temperature measurement module.

9. The busbar unit of claim 1, wherein the accommodation portion is recessed from the outer surface of the holder, and at least a part of the temperature measurement module is accommodated in the accommodation portion.

10. The busbar unit of claim 9, wherein a portion of the temperature measurement module is disposed at a level higher than an upper surface of the holder in an axial direction of the motor.

11. The busbar unit of claim 9, wherein the accommodation portion is defined in an upper surface of the holder in an axial direction of the motor.

* * * * *